US008141932B2

(12) United States Patent
Schumacher et al.

(10) Patent No.: US 8,141,932 B2
(45) Date of Patent: Mar. 27, 2012

(54) LOCKING MECHANISM FOR A MOVABLE TOP OF A PASSENGER VEHICLE

(75) Inventors: Thorsten Schumacher, Kummerfeld (DE); Christof Blech, Renningen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 217 days.

(21) Appl. No.: 12/712,266

(22) Filed: Feb. 25, 2010

(65) Prior Publication Data

US 2010/0219659 A1 Sep. 2, 2010

(30) Foreign Application Priority Data

Feb. 27, 2009 (DE) ........................ 10 2009 010 721

(51) Int. Cl.
*B60J 7/185* (2006.01)

(52) U.S. Cl. ........................................ 296/121

(58) Field of Classification Search .................. 296/121, 296/218, 219; 292/114, 95
See application file for complete search history.

(56) References Cited

U.S. PATENT DOCUMENTS

| | | | | |
|---|---|---|---|---|
| 2,201,330 | A * | 5/1940 | Wernig et al. | 292/48 |
| 2,305,715 | A * | 12/1942 | Keller | 296/120.1 |
| 2,360,524 | A * | 10/1944 | Simpson | 296/120.1 |
| 2,411,945 | A * | 12/1946 | Vigmostad et al. | 296/120.1 |
| 2,785,914 | A * | 3/1957 | Thomas et al. | 292/7 |
| 3,494,659 | A | 2/1970 | Trenkler | |
| 4,415,189 | A * | 11/1983 | Kastelic, Jr. | 292/196 |
| 4,664,436 | A * | 5/1987 | Eyb | 296/121 |
| 4,819,983 | A * | 4/1989 | Alexander et al. | 296/121 |
| 4,830,425 | A * | 5/1989 | Muscat | 296/121 |
| 5,154,479 | A | 10/1992 | Sautter, Jr. | |
| 5,186,516 | A * | 2/1993 | Alexander et al. | 296/121 |
| 5,603,536 | A * | 2/1997 | Bauer et al. | 292/144 |
| 5,772,275 | A * | 6/1998 | Tokarz | 296/121 |
| 5,839,778 | A * | 11/1998 | Schaible et al. | 296/224 |
| 6,213,534 | B1 * | 4/2001 | MacFarland | 296/121 |
| 6,454,344 | B2 * | 9/2002 | Okada et al. | 296/121 |
| 6,758,511 | B2 * | 7/2004 | Taylor et al. | 296/121 |
| 6,837,535 | B2 * | 1/2005 | Plesternings | 296/121 |
| 6,988,767 | B2 * | 1/2006 | Schlachter et al. | 296/218 |
| 7,021,696 | B2 * | 4/2006 | Doncov et al. | 296/121 |
| 7,226,110 | B2 * | 6/2007 | Doncov et al. | 296/121 |
| 7,503,617 | B2 * | 3/2009 | Habacker | 296/121 |
| 2004/0046416 | A1 * | 3/2004 | Heller et al. | 296/121 |

FOREIGN PATENT DOCUMENTS

EP 1072456 A2 1/2001

* cited by examiner

*Primary Examiner* — H Gutman
(74) *Attorney, Agent, or Firm* — Brooks Kushman P.C.

(57) ABSTRACT

A locking mechanism for latching a convertible top to a cross-member of a windshield frame of a vehicle. The locking mechanism includes a support element, a locking hook, and a pin having a retaining section and a shaft connected together. The support element is mountable to a front portion of the convertible top. The locking hook is pivotably connected to the support element to be movable between resting and operating positions. The retaining section of the pin is fixedly mounted to the support element. The shaft of the pin is projectable along a direction into a corresponding recess of a receptacle in the cross-member of the windshield frame. The pin is of a plastic material that is rigid in shape and plastically deformable and the shaft is constricted in the direction in which the shaft is projectable into the corresponding recess of the receptacle in the cross-member.

14 Claims, 4 Drawing Sheets

13
16
24
18
15
19
17
25 26
Rst
14
21
22
23
10
20
Bst

LOCKING MECHANISM FOR A MOVABLE TOP OF A PASSENGER VEHICLE

CROSS-REFERENCE TO RELATED APPLICATIONS

This application claims foreign priority benefits under 35 U.S.C. §119(a)-(d) to DE 10 2009 010 721.5, filed Feb. 27, 2009, which is hereby incorporated by reference in its entirety.

BACKGROUND OF THE INVENTION

1. Field of the Invention

The present invention relates to a locking mechanism for latching a convertible top to a windshield frame.

2. Background Art

EP 1 072 456 B1 describes a tensioning and locking mechanism for locking a convertible top to a vehicle body component. The mechanism includes a housing having a locking hook and a locating pin mounted thereon.

WO 92/15466 (corresponds to U.S. Pat. No. 5,154,479) describes a latch mechanism for latching a convertible top to a windshield frame. The mechanism includes a latch unit having a support with a locking hook and a locating pin mounted thereon. The locking hook engages an abutment of the windshield frame and the locating pin is received within a locating hole of the windshield frame in order to latch the convertible top to the windshield frame.

DE 1 580 535 (corresponds to U.S. Pat. No. 3,494,659) describes a convertible top held by a pin on its front section to a windshield frame, as seen in the direction of vehicle motion, held by a screw. The pin penetrates into a retaining aperture of the windshield frame to fix the top to the windshield frame.

SUMMARY OF THE INVENTION

An object of the present invention is a locking (latching) mechanism for locking (latching) a convertible top (i.e. a folding top, collapsible top, etc.) to a windshield frame in which the locking mechanism includes an immobilizing pin which is designed to enable smooth operation of the locking mechanism, can withstand high loadings, and is easily implemented.

In carrying out the above object and other objects, the present invention provides a locking mechanism for latching a convertible top to a cross-member of a windshield frame of a vehicle. The locking mechanism includes a support element, a locking hook, and a pin having a retaining section and a shaft connected together. The support element is mountable to a front portion of the convertible top. The locking hook is pivotably connected to the support element to be movable between a resting position and an operating position. The retaining section of the pin is fixedly mounted to the support element. The shaft of the pin is projectable along a direction into a corresponding recess of a receptacle in the cross-member of the windshield frame. The pin is of a plastic material that is rigid in shape and plastically deformable and the shaft is constricted in the direction in which the shaft is projectable into the corresponding recess of the receptacle in the cross-member of the windshield frame.

In embodiments of the present invention, a locking mechanism for latching a convertible top to an upper cross-member of a windshield frame includes a centering (i.e., immobilizing) pin. The pin has a retaining section and a shaft. The locking mechanism with its pin cooperates in an exemplary manner with the upper cross-member. The pin contributes to this cooperation due to its specific shape. In particular, the pin is both rigid in shape and plastically deformable. When the shaft of the pin is introduced into a corresponding recess of the upper cross-member, the material of the shaft also assumes relatively large tolerances, and the shaft is captured essentially soundlessly in the recess during operation of the convertible top to its closed position. The pin is of a suitable plastic and its retaining section is pliably form fitted to a support element of the locking mechanism. The support element is made of metal. The pin can be manufactured by casting, injection molding, foaming, or comparable means, to the support element. In this connection, a nose piece of the support element is stretched over the shaft of the pin for reasons of rigidity, i.e., the material of the shaft of the pin at least partially surrounds the nose piece.

In an embodiment, the pin is formed at adjoining corner sides of a body section of the support element. The pin surrounds external and internal walls of the body section of the support element with first and second centering wall sections.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
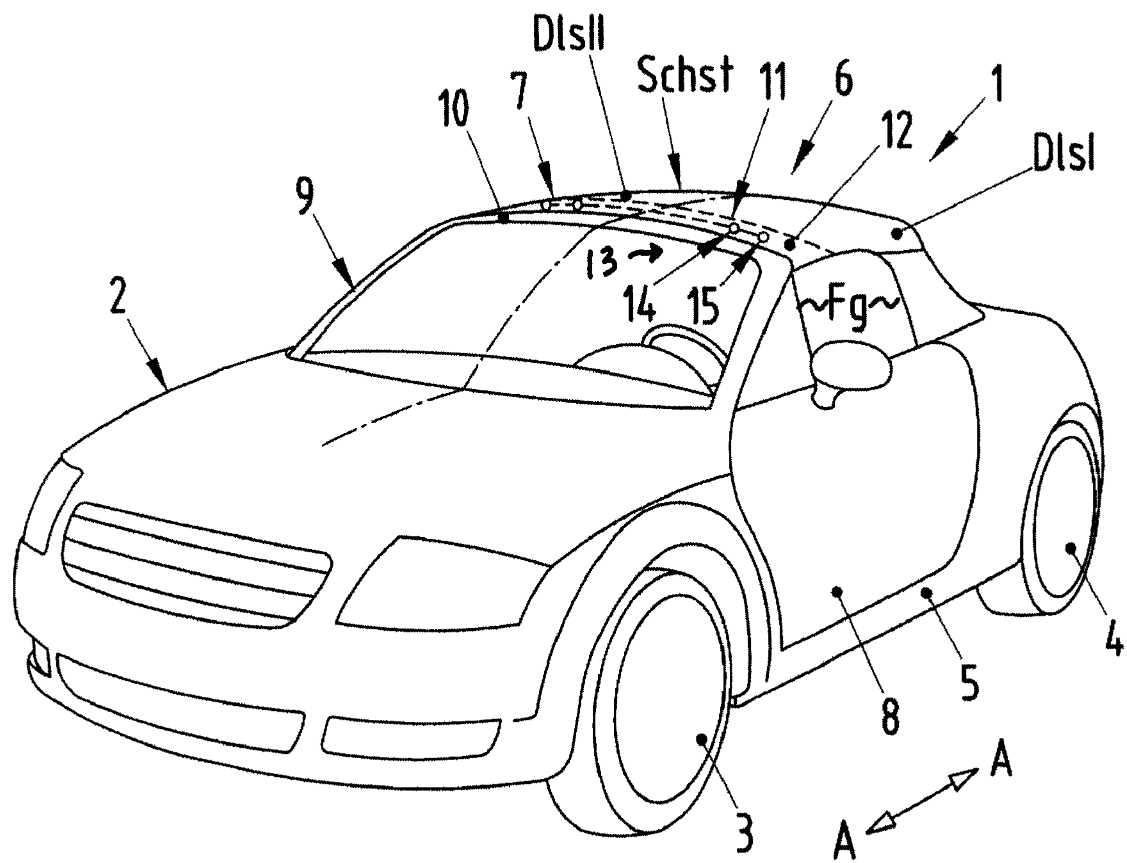
FIG. 1 illustrates a perspective view of a vehicle having a folding top and a locking mechanism in accordance with an embodiment of the present invention.

Referring now to FIG. 1, a perspective view of a passenger vehicle 1 having a folding (i.e., convertible, collapsible, etc.) top 7 and a locking mechanism 13 in accordance with an embodiment of the present invention is shown. Vehicle 1 includes a vehicle body 2 having a vehicle frame 5 that is supported by two sets of wheels 3 and 4. Vehicle body 2 includes side doors 8 which are mounted to vehicle frame 5. Vehicle frame 5 includes a windshield frame 9. Windshield frame 9 has an upper cross-member 10. Upper-cross member 10 extends transversely to vehicle longitudinal direction A-A between the longitudinal sides of vehicle body 2.

Folding top 7 represents a vehicle roof 6 that is movable between a closed position Schst and an opened position relative to vehicle body 2. In the closed position (shown in FIG. 1), folding top 7 extends over and covers a passenger compartment Fg of vehicle body 2. In the opened position, folding top 7 is rearwardly lowered into the trunk or the like of vehicle body 2 and stored therein.

A front region 11 of folding top 7 includes a folding top header (i.e., a front roof bow, a roof cap) 12. Folding top header 12 extends transversely to vehicle longitudinal direction A-A between the longitudinal sides of vehicle body 2. Folding top header 12 borders upper cross-member 10 of windshield frame 9 when folding top 7 is in the closed position.

Locking mechanism 13 is associated with front region 11 of folding top 7. In particular, locking mechanism 13 is mounted to folding top header 12. In the closed position, locking mechanism 13 is operable for connecting (i.e., locking, latching) folding top header 12 with upper cross-member 10 of windshield frame 9 in order to connect folding top 7 to windshield frame 9. Similarly, locking mechanism 13 is operable for disconnecting (i.e., unlocking, unlatching) folding top header 12 from upper cross-member 10 in order to disconnect folding top 7 from windshield frame 9.

Figure 2:
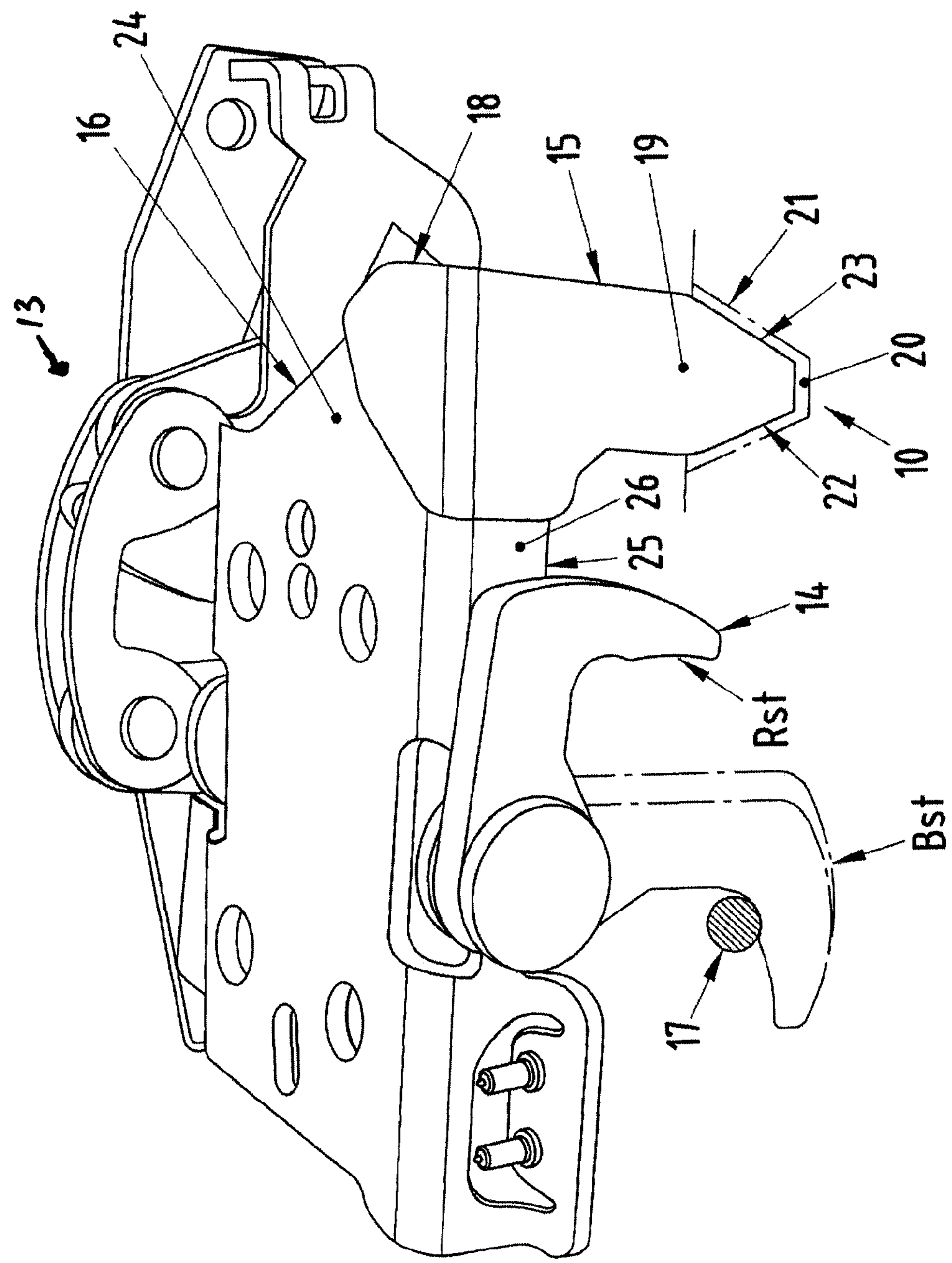
FIG. 2 illustrates a perspective view of the locking mechanism.
Figure 3:
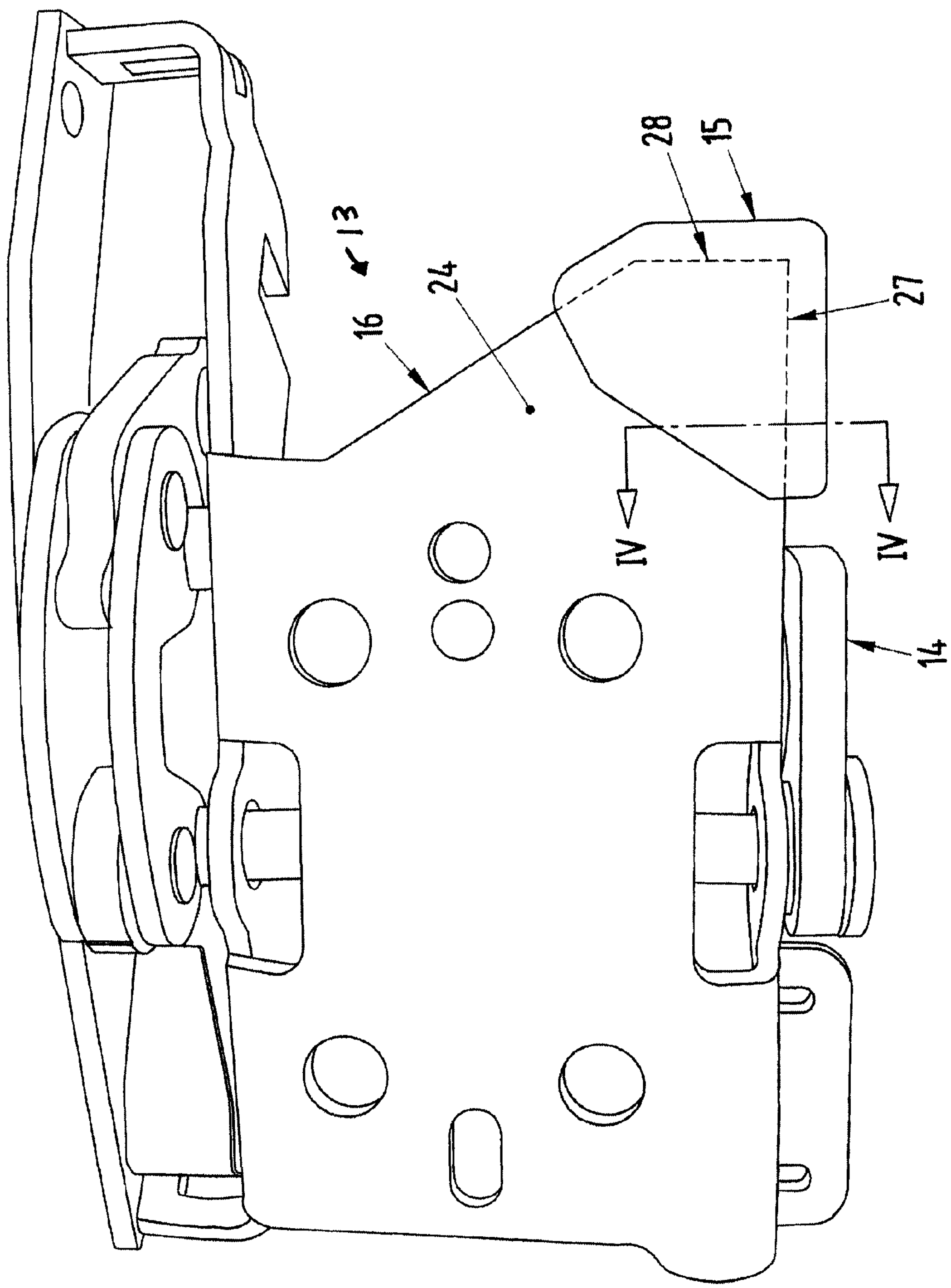
FIG. 3 illustrates a top view of the locking mechanism.

Referring now to FIGS. 2 and 3, with continual reference to FIG. 1, locking mechanism 13 will be described in greater detail. Locking mechanism 13 described herein represents one of a pair of locking units for use with vehicle 1. The locking units are transversely spaced apart from one another in the vehicle longitudinal direction A-A. In particular, the locking units are located near respective longitudinal sides DsI and DsII of folding top 7 in front region 11 of folding top 7. The locking units are symmetrically identical in construction and thus only locking unit (designated as locking mechanism 13) is described herein.

Locking mechanism 13 includes a support element 16. Support element 16 is fixedly mounted to folding top header 12 (or, alternatively, to another portion of front region 11 of folding top 7). Support element 16 is a plate-like object having a flat body section 24. Flat body section 24 includes a front edge portion (i.e., a nose piece) 25. Nose piece 25 is formed from a bent limiting flange 26.

Locking mechanism 13 further includes a locking hook (i.e., a J-hook) 14. Locking hook 14 is pivotably connected to nose piece 25 of support element 16 to be transversely movable between a rest position Rst and an operating position Bst. In the rest position Rst, locking hook 14 extends transversely along nose piece 25. In the operating position Bst, locking hook 14 extends downward from nose piece 25. In the closed position of folding top 7 (i.e., when folding top header 12 is adjacent upper cross-member 10 of windshield frame 9), locking hook 14 can be moved to the operating position Bst to grip a bolt (i.e., an abutment) 17 of upper cross-member 10. Bolt 17 is oriented in longitudinal vehicle direction A-A at a retaining point of upper cross-member 10. Locking hook 14 grips bolt 17 to connect folding top header 12 to windshield frame 9. In the rest position Rst, locking hook 14 is disengaged from bolt 17.

Locking mechanism 13 further includes a centering (i.e., locating, immobilizing) pin 15. Pin 15 is rigidly and/or fixedly mounted to support element 16. In particular, pin 15 is connected by a form fit, using compressive properties of force, with support element 16. To this end, pin 15 is cast, manufactured by injection molding, or foamed to support element 16. Pin 15 is rigid and is fabricated from a material such as metal or plastic. Pin 15 is spaced apart transversely from locking hook 14.

Pin 15 includes a retaining section 18. Retaining section 18 is mounted to flat body section 24 of support element 16 in order to fixedly mount pin 15 to support element 16. Retaining section 18 is fabricated from a plastic material and is rigid, but deformable to a certain extent (i.e., plastically deformable).

Pin 15 further includes a shaft 19. Shaft 19 extends downward from retaining section 18 and from support element 16. Nose piece 25 of support element 16 penetrates into shaft 19, i.e., the material of pin 15 surrounds nose piece 25 extending therethrough. In the closed position of folding top 7 (i.e., when folding top header 12 is adjacent upper cross-member 10 of windshield frame 9), shaft 19 penetrates into a recess (i.e., a locating hole) 20 in upper cross-member 10. Shaft 19 penetrates into locating hole 20 in order to properly locate folding top header 12 to upper cross-member 10 when folding top header 12 is adjacent upper cross-member 10 to enable locking hook 14 to be in a proper position to engage bolt 17. Subsequent to shaft 19 penetrating recess 20 of upper cross-member 10, locking hook 14 may be moved to the operating position Bst to grip bolt 17 of upper cross-member 10 as described above.

Recess 20 forms a receptacle 21 in upper cross-member 10. Receptacle 21 receives the end of shaft 19 of pin 15 when shaft 19 penetrates into recess 20. Receptacle 21 includes a wedge-shaped constriction 23. The end of shaft 19 narrows in the direction of receptacle 21 and includes a wedge-shaped constriction 21 which matches constriction 23 of receptacle 21.

Figure 4:
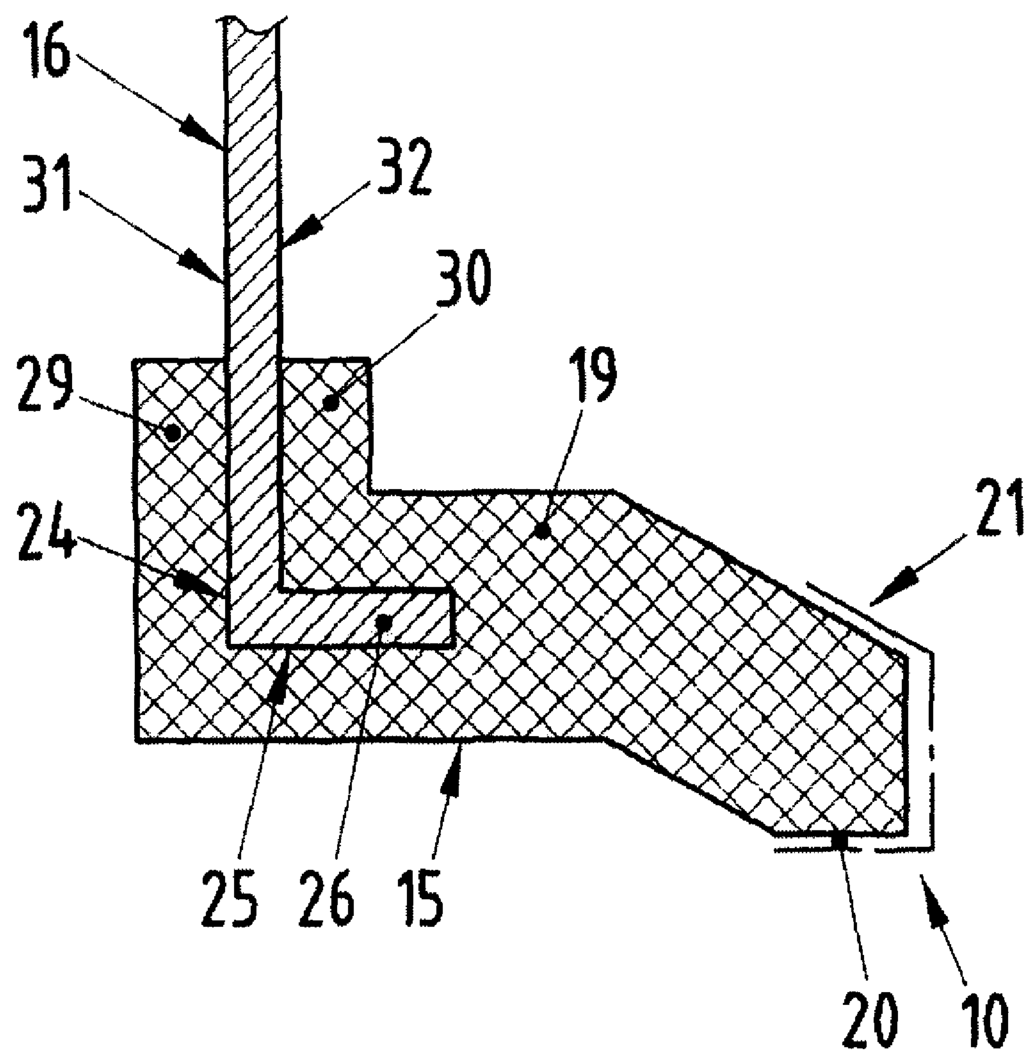
FIG. 4 illustrates an enlarged schematic section of the locking mechanism along line IV-IV in FIG. 3.

As shown in FIG. 3, pin 15 (in particular, retaining section 18 of pin 15) is formed on respective corner sides 27 and 28 of flat body section 24 of support element 16. With reference to FIG. 4, pin 15 immediately surrounds exterior and interior walls 31 and 32 of flat body section 24 with first and second centering wall sections 29 and 30.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A locking mechanism for latching a convertible top to a cross-member of a windshield frame of a vehicle, the locking mechanism comprising:

a support element mountable to a front portion of a convertible top;

a locking hook pivotably connected to the support element to be movable between a resting position and an operating position; and a pin having a retaining section and a shaft connected together, wherein the retaining section is fixedly mounted to the support element, wherein the shaft is projectable along a direction into a corresponding recess of a receptacle in the cross-member of a windshield frame;

wherein the pin is of a plastic material that is plastically deformable and the shaft is constricted in the direction in which the shaft is projectable into the corresponding recess of the receptacle in the cross-member of the windshield frame;

wherein the support element has a flat body section with a nose piece, wherein the nose piece of the flat body section of the support element projects through the shaft of the pin.

2. The locking mechanism of claim 1 wherein:

the nose piece of the flat body section of the support element is metal.

3. The locking mechanism of claim 1 wherein:

the retaining section of the pin is fixedly mounted to adjoining corner sides of the flat body section of the support element.

4. The locking mechanism of claim 3 wherein:

the pin further includes a first centering wall section;

wherein the flat body section of the support element includes an external wall;

wherein the first centering wall section of the pin at least partially surrounds the external wall of the flat body section of the support element.

5. The locking mechanism of claim 3 wherein:

the pin includes first and second centering wall sections;

wherein the flat body section of the support element includes external and internal walls;

wherein the first and second centering wall sections surround the external wall and internal walls of the flat body section of the support element.

6. The locking mechanism of claim 1 wherein:

the shaft includes a constriction on an external side to be constricted in the direction in which the shaft is projectable into the corresponding recess of the receptacle in the cross-member of the windshield frame.

7. The locking mechanism of claim 6 wherein:

the constriction is a wedge.

8. A vehicle comprising:

a windshield frame having a cross-member, wherein the cross-member includes an abutment and a receptacle;

a convertible top having a folding top header, wherein the convertible top is movable between a closed position in which the folding top header is adjacent to the cross-member and an opened position in which the folding top header is disposed away from the cross-member;

a locking mechanism for latching the convertible top to the cross-member, the locking mechanism including a support element, a locking hook, and a pin;

wherein the support element is mounted to the folding top header;

wherein the locking hook is pivotably connected to the support element to be movable between a resting position in which the locking hook is disengaged from the abutment of the cross-member and an operating position in which the locking hook engages the abutment of the cross-member while the convertible top is in the closed position;

wherein the pin has a retaining section and a shaft connected together, wherein the retaining section is fixedly mounted to the support element, wherein the shaft projects into the receptacle in the cross-member while the convertible top is in the closed position, wherein the pin is of a plastic material that is plastically deformable, wherein the shaft is constricted in the direction in which the shaft projects into the receptacle in the cross-member;

wherein the support element has a flat body section with a nose piece, wherein the nose piece of the flat body section of the support element projects through the shaft of the pin.

9. The vehicle of claim 8 wherein:

the nose piece of the flat body section of the support element is metal.

10. The vehicle of claim 8 wherein:

the retaining section of the pin is fixedly mounted to adjoining corner sides of the flat body section of the support element.

11. The vehicle of claim 10 wherein:

the pin further includes a first centering wall section;

wherein the flat body section of the support element includes an external wall;

wherein the first centering wall section of the pin at least partially surrounds the external wall of the flat body section of the support element.

12. The vehicle of claim 10 wherein:

the pin includes first and second centering wall sections;

wherein the flat body section of the support element includes external and internal walls;

wherein the first and second centering wall sections surround the external wall and internal walls of the flat body section of the support element.

13. The vehicle of claim 8 wherein:

the shaft includes a constriction on an external side to be constricted in the direction in which the shaft projects into the recess of the receptacle in the cross-member.

14. The vehicle of claim 13 wherein:

the constriction is a wedge.

* * * * *